United States Patent Office 3,592,837
Patented July 13, 1971

3,592,837
BIS-(PHENOXYPHENYL) CARBONATES
Walter Traber, Riehen, and Anton G. Weiss, Basel,
Switzerland, assignors to Geigy Chemical Corporation,
Ardsley, N.Y.
No Drawing. Filed July 26, 1968, Ser. No. 747,792
Claims priority, application Switzerland, Aug. 1, 1967,
10,854/67
Int. Cl. C07c 69/00; C11d 3/48; A61l 13/00
U.S. Cl. 260—463          6 Claims

ABSTRACT OF THE DISCLOSURE

Bis-(phenoxyphenyl) carbonates which are unsubstituted or substituted in one or several of their benzene rings by halogen, lower alkyl or trifluoromethyl are disclosed as antibacterial agents.

---

The present invention concerns new bis-(phenoxyphenyl) carbonates, processes for the production thereof, the use of these esters as active substances for the disinfection of laundered goods and in antibacterial agents and preparations for the combatting of bacteria, as well as the material treated with these carbonic acid esters.

Halogenated 2-hydroxy-diphenyl ethers, having antibacterial properties, are described in British Pat. No. 1,024,022 and esters of halogenated 2-hydroxy-diphenyl ethers with aliphatic dicarboxylic acids also having antibacterial properties are disclosed in Belgian Pat. No. 659,636. These types of compounds, however, are only insufficiently suitable for the disinfection and protection of laundered goods since their bactericidal activity is completely lost when used in washing liquids containing chlorine.

The new bis-(phenoxyphenyl) carbonates correspond to the general Formula I:

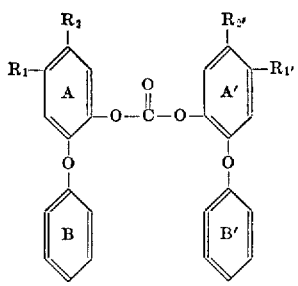

(I)

wherein $R_1$, $R_1'$, $R_2$ and $R_2'$ independently of each other each represent hydrogen or a halogen atom of an atomic number of at most 35, and the benzene rings B and B' independently of each other are each unsubstituted or are mono- to tri-substituted by halogen of an atomic number of at most 35 or by lower alkyl, or mono- or is substituted by the trifluoromethyl group.

The carbonic acid esters of general Formula I are particularly suitable for the disinfection and protection of laundered goods. Even when washing liquors containing chlorine are used, their full bactericidal activity is virtually retained.

In the general Formula I, particularly chlorine and bromine are to be understood by halogen of an atomic number of at most 35. Lower alkyl radicals have 1 or 2 carbon atoms, i.e. they are the methyl or ethyl radicals.

The new carbonic acid esters of general Formula I have good bactericidal and bacteriostatic properties against gram positive and gram negative bacteria such as Staphylococcus spec., *Staphylococcus aureus*, Smith, *Staphylococcus lactis*, also *Bacillus mesentericus*, *Bacillus pumilus*, *Bacillus subtilis*, Coli forms, *Corynebacterium diphtheriae*, *Chlostridium botulium*, *Chlostridium butyricum*, *Clostridium welchii*, *Clostridium tetani*, *Klebsiella pneumoniae*, *Alcaligenes faecalis*, Sarcina spec., *Salmonella pullorum*, *Salmonella typhi*, *Salmonella paratyphi* A and B, *Salmonella typhi murium*, *Salmonella enteritidis*, *Shigella dysenteriae*, *Shigella flexneri*, *Brucella abortus*, *Proteus mirabilis*, Achromobacter spec., *Serratia marcescens*, *Pasteurella pseudotuberculosis*. In addition, they have low toxicity to warm blood animals and have no irritant action at all on the skin and mucous membranes. Because of these good properties, the new esters can be used for the most various purposes, e.g. for the protection of organic materials and useful objects, particularly as bactericidal additives to cleansing materials of all types such as soaps and detergents.

Moreover, the new esters can serve as active substances in pharmaceutical preparations, both for internal and external use.

The bis-(phenoxyphenyl) carbonates of the general Formula I are obtained according to the invention either by reacting two equivalents of a hydroxydiphenyl ether of general Formula II

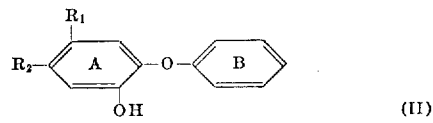

(II)

with one equivalent of phosgene, or by reacting one equivalent of such an hydroxydiphenyl ether with one equivalent of a phenoxyphenyl chlorocarbonate of the general formula III

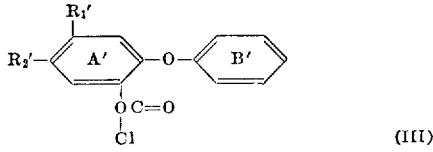

(III)

in which formulae $R_1$, $R_1'$, $R_2$ and $R_2'$ have the meanings given in Formula I and the benzene rings B and B' have the definitions given above, the reactions preferably being performed in the presence of an acid binding agent.

The hydroxy-diphenyl ethers of general Formula II are known starting materials or they can be obtained by the process according to British Pat. No. 1,024,022. Chlorocarbonates of the general Formula III also belong to a known class of compounds which can be produced in the known way by reaction of a hydroxy-diphenyl ether of general Formula II with phosgene.

For the production of the new carbonic acid esters of the general Formula I, the following hydroxydiphenyl ethers of the general Formula II can be used:

3',4'-dichloro-2-hydroxy-diphenyl ether,
3',4',4-trichloro-2-hydroxy-diphenyl ether,
2',4'-dichloro-2-hydroxy-diphenyl ether.
2',4'-dibromo-4-chloro-2-hydroxydiphenyl ether,
4-chloro-2-hydroxydiphenyl ether,
4,4'-dichloro-2-hydroxy-diphenyl ether,
4-chloro-4'-bromo-2-hydroxy-diphenyl ether,
4'-methyl-4-chloro-2-hydroxy-diphenyl ether,
4,4'-dichloro-5-bromo-2-hydroxy-diphenyl ether,
4,2'-4'-trichloro-5-bromo-2-hydroxy-diphenyl ether, 4,2′-4′-trichloro-2-hydroxy-diphenyl ether,
4-bromo-4′-chloro-2-hydroxy-diphenyl ether,
2′,4′,5′-4-tetrachloro-2-hydroxy-diphenyl ether,
4,2′,4′-tribromo-2-hydroxy-diphenyl ether,
4-bromo-2′,4′-dichloro-2-hydroxy-diphenyl ether,
4,4′-dibromo-2-hydroxy-diphenyl ether.
4′-chloro-2-hydroxy-diphenyl ether, and
4,4′-dichloro-3′-trifluoromethyl-2-hydroxy-diphenyl ether.

The 2-hydroxy-diphenyl ethers are preferred which are substituted by at least one and at most three halogen atoms or by 1 or 2 halogen atoms and/or a lower alkyl or trifluoromethyl radical.

In the process according to the invention, organic bases such as tertiary amines, e.g. pyridine, triethylamine, and inorganic bases such as the hydroxides and carbonates of alkali and alkaline earth metals are used as acid binding agents. Halogenated hydrocarbons, amides, ethers and ether-type compounds are used as solvents or diluents in the process mentioned.

The following examples describe the production of some bis(phenoxyphenyl) carbonates of the general Formula I. The temperatures are given on degrees centigrade and parts are to be understood as parts by weight and are related to parts by volume as grams to milliliters.

EXAMPLE 1

144.7 parts of 4,2′,4′ - trichloro-2-hydroxy-diphenyl ether and 39.5 parts of pyridine are dissolved in 600 parts by volume of methylene chloride. 25 parts of phosgene are introduced into the clear solution at 10–20°, during which time white crystals precipitate. The excess phosgene is then removed by bubbling gaseous nitrogen through the mixture. The crystals are isolated and washed with methylene chloride. The filtrate is then shaken several times with 150 parts by volume of water and dried over sodium sulphate. After distilling off the methylene chloride, O,O′-bis-[2-(2′,4′-dichlorophenoxy)-5-chlorophenyl] carbonate is obtained as a highly viscous oil which crystallizes on standing. Recrystallised from isopropyl ether, the diester melts at 128–130°.

EXAMPLE 2

(a) 210 parts of phosgene are sparged at 5° to 10° into a solution of 435 parts of 4,2′,4′-trichloro-2-hydroxy-diphenyl ether in 900 parts by volume of dry toluene. At 0° to 5°, a solution of 166 parts of triethylamine in 300 parts by volume of dry toluene is then added dropwise.

The reaction mixture is stired for 4 hours at room temperature, and the excess phosgene is then removed by sparging dry nitrogen into the mixture. The precipitated amine hydrochloride is filtered off and the filtrate evaporated in vacuo. The residue is vacuum-distilled and 2-(2′,4′-dichlorophenoxy)-5-chlorophenyl chlorocarbonate is obtained, B.P. 160–162°/0.5 Torr.

(b) A solution of 148 parts of 2-(2′,4′-dichlorophenoxy)-5-chlorophenyl chlorocarbonate in 500 parts by volume of methylene chloride is added dropwise to a solution of 119 parts of 4,2′,4′-trichloro-2-hydroxy-diphenyl ether and 324 parts of pyridine in 500 parts by volume of methylene chloride at 0° to 5°. The reaction mixture is stirred at room temperature for two hours, filtered and the filtrate washed with water and dried with magnesium sulfate. After evaporating the solvent, the O,O′-bis-[2,(2′,4′-dichlorophenoxy)-5-chlorophenyl] carbonate is obtained. M.P. 128–130° after recrystallization from isopropyl ether.

EXAMPLE 3

A solution of 176 parts of 2-(2′,4′-dichlorophenoxy)-5-chlorophenyl chlorocarbonate (cf. Example 2a) in 500 parts by volume of methylene chloride is added dropwise to a solution of 127 parts of 4,4′-dichloro-2-hydroxy-diphenyl ether and 43 parts of pyridine in 500 parts by volume of methylene chloride at 0° to 5°. The reaction mixture is stirred at room temperature for two hours, filtered, washed with water and dried with magnesium sulfate.

After evaporating the solvent, the O-[2-(2′,4′-dichlorophenoxy) - 5-chlorophenyl]-O′-[2-(4′-chlorophenoxy)-5-chlorophenyl] carbonate is obtained as an oil. The oily product is purified by means of high vacuum distillation. B.P. 260–265°/0.05 Torr.

The following carbonic acid esters of Formula I are obtained in the manner described in Examples 1 to 3.

| Compounds | Melting point/Boiling point |
|---|---|
| O,O′-bis-[2-(4′-chlorophenoxy)-5-chlorophenyl] carbonate. | 84–86°. |
| O,O′-bis-[2-(2′,4′,6′-trichloro-phenoxy)-5-chlorophenyl] carbonate. | 143–145°. |
| O,O′-bis-[2-(4′-bromophenoxy)-5-chlorophenyl] carbonate. | 68–70°. |
| O,O′-bis-[2-(2′,4′-dichlorophenoxy)-5-bromophenyl] carbonate. | 116–118°. |
| O,O′-bis-[2-(4′-chlorophenoxy)-5-bromophenyl] carbonate. | 77–78°. |
| O,O′-bis-[2-(2′,4′-dichlorophenoxy)-4-bromo-5-chlorophenyl] carbonate. | 171–172°. |
| O,O′-bis-[2-(4′-chlorophenoxy)-4-bromo-5-chlorophenyl] carbonate. | 152–154°. |
| O,O′-bis-[2-(4′-bromophenoxy)-5-bromophenyl] carbonate. | 103–105°. |
| O,O′-bis-[2-(2′,4′-dibromophenoxy)-5-chlorophenyl] carbonate. | 160–162°. |
| O,O′-bis-[2-(4′-methylphenoxy)-5-chlorophenyl] carbonate. | 104–105°. |
| O,O′-bis-[2-(3′-trifluoromethyl-4′-chlorophenoxy)-5-chlorophenyl] carbonate. | 98–100°. |
| O-[2-(2′,4′-dichlorophenoxy)-5-chlorophenyl]-O′-(2-phenoxy-phenyl) carbonate. | 230–240°/0.01 torr. |
| O-[2-(2′,4′-dichlorophenoxy)-5-chlorophenyl]-O′-[2-(4′-chlorophenoxy)-5-bromophenyl] carbonate. | 255–265°/0.01 torr. |
| -[2-(2′,4′-dichlorophenoxy)-5-chlorophenyl]-O′-[2-(3′-trifluoromethyl-4′-chlorophenoxy)-5-chlorophenyl] carbonate. | 257–260°/0.01 torr. |

The carbonic acid esters of general Formula I have an excellent growth-inhibiting action in various series of tests, such as the incorporation test (testing of the growth of bacteria or fungi on culture medium into which various concentrations of the active substances have been incorporated) described by X. Bühlmann, W. A. Vischer and H. Bruhin [Zbl. Bakt. Abteilung I, Originale, 180, 327–334 (1960)], and the diffusion test (measurement of the breadth of zones of inhibition) described by H Bruhin and X. Bühlmann [Path. Micro-biol. 26, 108–123 (1963)], against gram positive and gram negative bacteria such as *Staphylococcus aureus, Escherichia coli, Klebsiella pneumoniae, Salmonella typhi.*

Bacteriostatic activity in vitro (diffusion test)

Test substance is dissolved in a suitable solvent in a concentration of 5000 γ/cc.

Sterile strips of filter paper (5 x 85 mm., liquid take-up of each strip about 0.1 cc.) are dipped in the solution of test substance and then hung up to dry. Each strip is then placed in a petri dish (85 mm. inner diameter, filled with 20 cc. culture medium) and the dishes, containing uninoculated medium, are placed for 16 hours in an incubation chamber to allow the test substances to penetrate into the media. Only then is a strip of the medium inoculated with the bacteria for the test, after which they are bred for 24 hours at 37° C.

As result, the size of the zone of inhibition, including the width of the filter paper strip, is given in mm.

| | Bacteria | | | |
|---|---|---|---|---|
| Active substance | Esch. coli NCTC 86 | Klebs. pneu. NCTC 7242 | Salm. typhi NCTC 8384 | Staph. aureus NCTC 7447 |
| O,O′-bis-[2-(4′-chlorophenoxy)-5-chlorophenyl] carbonate | 45 | 47 | 45 | 55 |
| O,O′-bis-[2-(2′,4′-dichlorophenoxy)-5-chlorophenyl] carbonate | 45 | 47 | 46 | 55 |

Bacteriostatic activity in vitro (incorporation test)

The active substance to be tested is dissolved in a suitable solvent and, if possible, the solution is further diluted with the same solvent. The concentration of the solutions of active substance is so chosen that, after addition of the culture medium, the desired final concentration is attained. With water as solvent, the ratio of solution: culture medium should be about 1:10, with an organic solvent it is generally 1:100. In order to exclude a bacteriostatic action of the solvent used, a control is run with the solvent.

Still liquid agar culture is added to the solution of active substance and the mixture is poured into petri dishes so that each contains 20 cc. After it has solidified, the culture medium is inoculated with suitable suspensions of bacteria. The media are then placed in an incubation chamber for 24 hours at 37° C. The test is evaluated by determining the lowest concentration at which growth of the bacteria is completely inhibited.

The figures given in the following table are the minimal concentration which inhibits growth. They are shown in p.p.m. (parts of active substance per $10^6$ parts of diluent), which corresponds to an amount of 1γ per cc.

| Active substance | Bacteria | | | |
|---|---|---|---|---|
| | Esch. coli NCTC 86 | Klebs. pneu. NCTC 7242 | Salm. typhi NCTC 8384 | Staph. aureus NTCT 7447 |
| 0,0'-bis-[2-(4'-chloro-phenoxy)-5-chlorophenyl] carbonate | <1 | <1 | <1 | <1 |
| 0,0'-bis-[2-(2',4'-dichloro-phenoxy)-5-chlorophenyl] carbonate | <1 | <1 | <1 | <1 |

The bacteriostatic action of some compounds according to the invention was tested on the following strains of bacteria: *Staphylococcus aureus* SG 511, *Escherichia coli* 8196, *Bacillus pumilus* J.R.G. 132, *Sarcina ureae* J.R.G. 822.

The agar incorporation test according to Leonard and Blackford was used as test method. Nutrient agar plates containing 100, 30, 10 and 3 p.p.m. active substance are inoculated with solutions of the strains mentioned above and put into an incubation chamber for 2 x 24 hours at 37° C. The marginal concentrations inhibiting the growth of the individual strains are shown in the following table:

| Compound | Staph. aureus SG 511 | Bac. pumilus J.R.G. 132 | Sar. ureae J.R.G. 822 | Esch. coli 8196 |
|---|---|---|---|---|
| 0,0'-bis-[2-(4'-chlorophenoxy)-4-bromo-5-chlorophenyl] carbonate | 30 | 30 | 30 | 30 |
| 0,0'-bis-[2-(2',4'-dichlorophenoxy)-4-bromo-5-chlorophenyl] carbonate | 3 | 3 | 3 | |

The following tests were made to determine the bacteriostatic activity in washing liquors containing chlorine:

The active substance, previously dissolved in a ratio of 1:100 in dimethyl formamide, is added in the concentrations given to a washing liquor containing 2.5 g./litre of soap (A) and to a washing liquor containing 2.5 g./litre soap and 2 cc./litre of an aqueous sodium hypochlorite solution containing 15% active chlorine (B). Cotton fabric is introduced into this liquor (liquod ratio 1:20) and the liquor is heated to 90° C. The textile is treated for 20 minutes at this temperature, then rinsed twice for 3 minutes at 40° C. with permutit-water (liquor ratio 1:20), wrung out and dried. Circular samples (20 mm. diameter) are cut from this washed and treated textile and laid on agar plates which has been inoculated previously with 24 hour old cultures of *Staphylococcus aureus* SG 511 or *Escherichia coli* 96. The agar plates are then put into an incubating chamber for 24 hours at 37° C.

The values summarised in the following table give the extent of the zones of inhibition around the sample in mm; the sign (—) means no formation of colonies and the sign (+) means formation of colonies under the sample.

| Compounds | Concentration in p.p.m. | Staph. aureus | | E. coli | |
|---|---|---|---|---|---|
| | | A | B | A | B |
| O,O'-bis-[2-(4'-chlorophenoxy)-5-bromophenyl] carbonate. | 50 | 8— | 6— | 7— | 6— |
| | 100 | 9— | 6— | 8— | 6— |
| | 200 | 12— | 7— | 9— | 7— |
| O,O'-bis-[2-(4'-chlorophenoxy)-4-bromo-5-chlorophenyl] carbonate. | 100 | 5— | 1— | 2— | 0— |
| | 200 | 6— | 2— | 2— | 1— |
| O,O'-bis-[2-(2',4'-dichlorophenoxy)-5-bromophenyl] carbonate. | 100 | 5— | 3— | 2— | 0— |
| | 200 | 3— | 3— | 2— | 2— |
| O,O'-bis-[2-(2',4'-dichlorophenoxy)-5-chlorophenyl] carbonate. | 50 | 5— | 4— | 3— | 1— |
| | 100 | 6— | 5— | 4— | 3— |
| | 200 | 6— | 6— | 3— | 3— |
| O,O'-bis-[2-(4'-chlorophenoxy)-5-chlorophenyl] carbonate. | 50 | 8— | 6— | 7— | 5— |
| | 100 | 10— | 7— | 7— | 6— |
| | 200 | 10— | 8— | 8— | 9— |
| O,O'-bis-[2-(4'-bromophenoxy)-5-chlorophenyl] carbonate. | 50 | 6— | 5— | 7— | 4— |
| | 100 | 8— | 6— | 8— | 6— |
| | 200 | 10— | 6— | 9— | 7— |
| O,O'-bis-[2-(4'-bromophenoxy)-5-bromophenyl] carbonate. | 50 | 9— | 6— | 6— | 4— |
| | 100 | 9— | 8— | 6— | 5— |
| | 200 | 10— | 8— | 7— | 6— |
| di-[2-(4'-chlorophenoxy)-5-chlorophenyl] oxalate.[1] | 50 | 11— | 0+ | 10— | 0+ |
| | 100 | 11— | 0+ | 12— | 0+ |
| | 200 | 13— | 0+ | 12— | 0+ |
| di-[2-(2',4'-dichlorophenoxy)-5-chlorophenyl] oxalate.[1] | 50 | 9— | 0+ | 8— | 0+ |
| | 100 | 10— | 0+ | 9— | 0+ |
| | 200 | 12— | 0+ | 10— | 0+ |
| 2-hydroxy-4,4'-dichlorodiphenyl ether.[1] | 50 | 9— | 0+ | 10— | 0+ |
| | 100 | 13— | 0+ | 13— | 0+ |
| | 200 | 14— | 0+ | 14— | 0+ |
| 2-hydroxy-4,2',4'-trichlorodiphenyl ether.[1] | 50 | 10— | 0+ | 7— | 0+ |
| | 100 | 12— | 0+ | 9— | 0+ |
| | 200 | 13— | 0+ | 9— | 0+ |

[1] Compounds known from British Patent No. 1,024,022 and Belgian Patent No. 659,636.

This stability of action of the carbonic acid esters according to the invention is maintained not only in washing liquors containing hydrochlorite but also generally in all washing or rinsing liquors which contain active chlorine.

As wash-active substances, washing or rinsing liquors can contain, e.g. anion active compounds such as aromatic sulphonic acids substituted by lipophilic groups or their water soluble salts such as the sodium salt of dodecylbenzene sulphonic acid, or water soluble salts of sulphuric acid monoesters of higher molecular alcohols or their polyglycol ethers, e.g. soluble salts of dodecyl alcohol sulphate, or of dodecyl alcohol polyglycol ether sulphate, or alkali metal salts of higher fatty acids (soaps), also non-ionic wash-active substances such as polyglycol ethers of higher fatty alcohols, also polyglycol ethers of higher molecular alkylated phenols as well as so-called "amphoteric" wash-active substances, e.g. reaction products of the alkali metal salts of low halogen fatty acids with polyalkylene polyamines containing lipophilic radicals such as with lauryl diethylenetriamine. In addition, the liquor can also contain the usual auxiliaries such as water soluble perborates, polyphosphates, carbonates, silicates, optical brighteners, plasticisers, salts having an acid reaction such as ammonium or zinc silicofluoride, or certain organic acids such as oxalic acid, also finishers, e.g. those based on synthetic resins, or starch.

Primarily organic fibre material, chiefly that of natural origin such as that containing cellulose, e.g. cotton, or containing polypeptide, e.g. wool or silk, or fibre material of synthetic origin such as that based on polyamide, polyacrylonitrile or polyester, or mixtures of the fibres mentioned above, can be sterilised with such washing or rinsing liquors containing active substance.

In concentrations of about 1–200 p.p.m., the carbonic acid esters according to the invention lend both to the liquor as well as to the articles washed therewith substantial and long-lasting freedom from germs of the Staphylococci and Coli forms, and this is maintained even after exposure of the active substance or of the goods treated therewith. They differ from previously known compounds by their stability to light on the goods laundered therewith and by their great activity and breadth of action against gram positive and gram negative micro-organisms.

The new carbonic acid esters are also very effective against bacteria which cause perspiration odours so that they are suitable as deodorants for personal linen and for incorporation in cleaning agents such as soaps or shampoos, or as additives to other cosmetics.

In addition, the carbonic acid diphenyl esters can be incorporated direct into the material to be protected, e.g. into material having a synthetic resin bases such as polyamide and polyvinyl chloride, into paper treatment liquors, into printing thickeners made of starch or cellulose derivatives, into lacquers and paints which contain, e.g. casein, into cellulose, into viscose spinning masses, paper, animal glues or oils, into permanent sizes based on polyvinyl alcohol. In addition they can also be added to preparations of inorganic or organic pigments for the painting and decorating industry, plasticisers etc.

The carbonic acid esters of Formula I can further be used in the form of their organic solutions, e.g. as sprays, in dry cleaning additives, or the impregnation of wood. For this purpose, organic solvents, preferably non-water miscible solvents, particularly petroleum fractions, also however, water miscible solvents such as low alcohols, e.g. methanol or ethanol or ethylene glycol monomethyl or monoethyl ether, can be used. The carbonic acid esters of Formula I can be used in the form or their aqueous dispersions together with wetting or dispersing agents, e.g. for the protection of substances which tend to rot, e.g. leather, paper etc.

Solutions or dispersions of active substance which can be used for the protection of these materials should have a content of active substance of at least 0.001 g./litre.

In all these forms the new carbonic acid esters of general Formula I can be the sole active substances or they can be combined with other known antimicrobial, particularly antibacterial and/or antimycotic active substances. They can be combined with, e.g. halogenated and/or halogeno-alkylsubstituted salicyclic acid alkylamides and alkyl anilides, halogenated and/or halogeno-alkyl-substituted diphenyl ureas, optionally halogenated benzoxazolones, polychlorohydroxydiphenyl methanes, halogen-hydroxy-diphenyl sulphides, halogenated hydroxydiphenyl ethers, bactericidal 2-imino-imidazolidines or bactericidal quaternary compounds, dithiocarbamic acid derivatives or with tetramethyl thiuram disulphide. A broadening of the range of action and/or synergism occurs in some of the combinations mentioned of the carbonic acid esters usable according to the invention with other antimicrobial substances.

Example 4

To a detergent composition liquefiable at high temperature and composed of

|  | Parts |
|---|---|
| Sodium soap based on lauric, myristic and palmitic acid | 40 |
| Sodium tripolyphosphate | 30 |
| Tetrasodium pyrophosphate | 5 |
| Sodium silicate | 4 |
| Magnesium silicate | 3 |
| Tetrasodium salt of ethylene diamine tetraacetic acid | 0.5 |
| Sodium carbonate | 5 |
| Sodium sulfate | 5.5 |
| Water | 70 | there are added at 85 to 90°

|  | Part |
|---|---|
| 1 - (3'-chlorophenyl)-3-(4''-chlorophenyl)-pyrazoline (optical brightener) | 0.2 |
| O,O'-bis-[2-(2',4'-dichlorophenoxy) - 5 - chlorophenyl]carbonate | 1.0 |

The components are thoroughly mixed and then dried in the spray tower. A spreadable bactericidal detergent is obtained.

EXAMPLE 5

200 parts of soap powder, consisting of

|  | Percent |
|---|---|
| Mixture of the sodium salt of tallow fatty acid and sodium salt of coconut oil fatty acid (weight ratio 70:30) | 88.0 |
| Almond oil | 2.0 |
| Perfume | 1.0 |
| Titanium dioxide | 0.2 |
| Glycerol | 0.5 |
| Tetrasodium salt of ethylene diamine tetraacetic acid | 0.05 |
| 1 - (3'-chlorophenyl)-3-(4'-chlorophenyl)-pyrazole (optical brightener) | 0.05 |
| O,O' - bis - [2-(4'-bromophenoxy)-5-bromophenyl] carbonate | 2.0 |
| Water | 6.2 | together with 400 parts of water are worked at 80° into a homogeneous mass and then dried at 70 to 80° in vacuo. A brightened bactericidal soap material is obtained which can be formed into pieces or ground into a powder.

EXAMPLE 6

992 parts of a heavy-duty non-soap syntheic detergent consisting of

|  | Parts |
|---|---|
| Dodecyl benzene sulfonate | 152 |
| Sodium salt of lauryl alcohol sulfonic acid ester | 38 |
| Sodium tripolyphosphate | 256 |
| Tetrasodium pyrophosphate | 76 |
| Sodium silicate | 40 |
| Magnesium silicate | 19 |
| Sodium carbonate | 50 |
| Carboxymethylcellulose | 14 |
| Tetrasodium salt of ethylene diamine tetraacetic acid | 0.3 |
| Sodium sulfate | 343 | are mixed with 1000 parts of water to form a homogeneous slurry. To this mixture are added 1 part of 4,4'-bis-[4'',6'' - diphenylamino-1'',3'',5''-triazinyl-(2'')-amino]-stilbene-2,2'-disulfonic acid(optical brightener) and 10 parts of O,O'-bis-[2-(4'-chlorophenoxy)-5-chlorophenyl] carbonate, the whole is mixed well then dried in the spray tower and ground into a powder. A bactericidal synthetic detergent is thus obtained.

We claim:
1. A compound of the formula

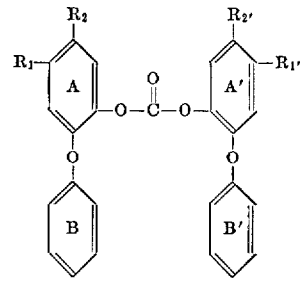

wherein
each of $R_1$, $R_1'$, $R_2$ and $R_2'$ represents hydrogen or halogen of an atomic number of at most 35, and
each of the benzene rings B and B', independently, is unsubstituted, mono- to tri-substituted by a member selected from the group consisting of halogen of an atomic number of at most 35 and lower alkyl, or mono- or di-substituted by trifluoromethyl.

2. A compound as defined in claim 1, which is O,O'-bis - [2-(2(,4'-dichlorophenoxy)-5-chlorophenyl] carbonate.

3. A compound as defined in claim 1, which is O,O'-bis-[2-(4'-chlorophenoxy)-5-chlorophenyl] carbonate.

4. A compound as defined in claim 1, which is O,O'-bis-[2-(4'-bromophenoxy)-5-chlorophenyl] carbonate.

5. A compound as defined in claim 1, which is O,O'-bis-[2-(4'-bromophenoxy)-5-bromophenyl] carbonate.

6. A compound as defined in claim 1, which is O-[2-(2',4' - dichlorophenoxy) - 5-chlorophenyl] - O'-[2-(4'-chlorophenoxy)-5-chlorophenyl] carbonate.

References Cited

Chemical Abstracts 64 (2) 2010G 11, Jan. 17, 1966.

ELBERT L. ROBERTS, Primary Examiner

D. G. RIVERS, Assistant Examiner

U.S. Cl. X.R.

106—25, 26, 135, 146, 164; 252—106, 107; 260—398.5; 424—65, 301